United States Patent
Crozet et al.

(10) Patent No.: US 11,332,676 B2
(45) Date of Patent: May 17, 2022

(54) METHOD FOR REMOVING ARSENIC USING A REMOVAL MASS MADE OF NICKEL OXIDE PARTICLES

(71) Applicant: IFP Energies nouvelles, Rueil-Malmaison (FR)

(72) Inventors: Nathalie Crozet, Rueil-Malmaison (FR); Anne-Claire Dubreuil, Rueil-Malmaison (FR); Philibert Leflaive, Rueil-Malmaison (FR); Michel Thomas, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/046,323

(22) PCT Filed: Apr. 8, 2019

(86) PCT No.: PCT/EP2019/058839
§ 371 (c)(1),
(2) Date: Oct. 9, 2020

(87) PCT Pub. No.: WO2019/197352
PCT Pub. Date: Oct. 17, 2019

(65) Prior Publication Data
US 2021/0146330 A1 May 20, 2021

(30) Foreign Application Priority Data
Apr. 11, 2018 (FR) ...................................... 1853150

(51) Int. Cl.
| C10G 45/06 | (2006.01) |
|---|---|
| C10G 49/04 | (2006.01) |
| C10G 25/00 | (2006.01) |
| B01J 20/02 | (2006.01) |
| B01J 23/755 | (2006.01) |
| C10G 67/06 | (2006.01) |
| B01J 35/00 | (2006.01) |

(52) U.S. Cl.
CPC ........ *C10G 25/003* (2013.01); *B01J 20/0225* (2013.01); *B01J 23/755* (2013.01); *B01J 35/006* (2013.01); *C10G 45/06* (2013.01); *C10G 49/04* (2013.01); *C10G 67/06* (2013.01); *B01J 2523/847* (2013.01); *C10G 2300/104* (2013.01); *C10G 2300/1088* (2013.01); *C10G 2300/202* (2013.01); *C10G 2300/205* (2013.01)

(58) Field of Classification Search
CPC . C10G 25/003; C10G 45/02–06; B01J 35/006
See application file for complete search history.

(56) References Cited

U.S. PATENT DOCUMENTS

| 3,328,316 A | 6/1967 | Mulaskey |
| 4,046,674 A | 9/1977 | Young |
| 5,489,722 A | 2/1996 | Resasco |
| 7,901,567 B2 * | 3/2011 | Coupard .............. C10G 25/003 208/253 |
| 2009/0139901 A1 | 6/2009 | Picard et al. |
| 2018/0154340 A1 | 6/2018 | Boualleg et al. |
| 2018/0207622 A1 | 7/2018 | Boualleg et al. |

FOREIGN PATENT DOCUMENTS

| CN | 106311316 A * | 1/2017 | .............. B01J 29/48 |
| FR | 2923837 A1 | 5/2009 | |
| FR | 3022160 A1 | 12/2015 | |
| WO | 2013093231 A1 | 6/2013 | |
| WO | 2015189190 A1 | 12/2015 | |

OTHER PUBLICATIONS

English machine translation of CN 106311316, obtained from WIPO. (Year: 2017).*
International Search Report for PCT/EP2019/058839 dated Jun. 4, 2019.
Wang, G. et al., "Isobutane Dehydrogenation over Metal (Fe, Co, and Ni) Oxide and Sulfide Catalysts: Reactivity and Reaction Mechanism," ChemCatChem, Jul. 7, 2014, vol. 6, No. 8, pp. 2305-2314.
English Abstract of WO-2013093231, Publication Date: Jun. 27, 2013.

* cited by examiner

*Primary Examiner* — Renee Robinson
(74) *Attorney, Agent, or Firm* — Millen White Zelano and Branigan, PC; Csaba Henter

(57) ABSTRACT

The invention describes a process for the capture of organometallic impurities in a hydrocarbon feedstock of gasoline type containing olefins and sulfur, in which a capture body is brought into contact with the feedstock to be treated and a stream of hydrogen, said capture body comprises an active phase based on nickel oxide particles with a size of less than or equal to 15 nm, said active phase not comprising other metal elements of Group VIb or Group VIII, which are deposited on a porous support chosen from the group consisting of aluminas, silica, silicas/aluminas, or also titanium or magnesium oxides, used alone or as a mixture with alumina or silica/alumina.

13 Claims, No Drawings

METHOD FOR REMOVING ARSENIC USING A REMOVAL MASS MADE OF NICKEL OXIDE PARTICLES

FIELD OF THE INVENTION

The present invention relates to the field of hydrotreating of gasoline cuts, in particular gasoline cuts resulting from fluidized-bed catalytic cracking units. More particularly, the present invention relates to a process for the capture of organometallic impurities, such as organometallic impurities of heavy metals, silicon or phosphorus, and more particularly arsenic, in hydrocarbon fractions of gasoline type rich in olefins and in sulfur, employing a capture body.

The invention applies very particularly to the treatment of gasoline cuts containing olefins and sulfur, such as gasolines resulting from catalytic cracking, for which it is desired to extract the arsenic, without hydrogenating the olefins and the aromatics.

The specifications for automotive fuels provide for a sharp reduction in the sulfur content in these fuels, and in particular in gasolines. This reduction is intended to limit, in particular, the content of sulfur oxide and nitrogen oxide in automotive exhaust gases. The specifications currently in force in Europe since 2009 for gasoline fuels set a maximum content of 10 ppm by weight (parts per million) of sulfur. Such specifications are also in force in other countries, such as, for example, the United States and China, where the same maximum sulfur content has been required since January 2017. To achieve these specifications, it is necessary to treat the gasolines by desulfurization processes.

The main sources of sulfur in bases for gasolines are "cracked" gasolines and mainly the gasoline fraction resulting from a process for the catalytic cracking of a residue from the atmospheric or vacuum distillation of a crude oil. This is because the gasoline fraction resulting from catalytic cracking, which represents on average 40% of gasoline bases, contributes for more than 90% to the supply of sulfur in gasolines. Consequently, the production of low sulfur gasolines requires a step of desulfurization of catalytic cracking gasolines. Mention is also made, among the other sources of gasolines which may contain sulfur, of coker or visbreaker gasolines or, to a lesser extent, gasolines resulting from atmospheric distillation or steam cracking gasolines.

The removal of the sulfur in gasoline cuts consists in specifically treating these sulfur-rich gasolines by desulfurization processes in the presence of hydrogen. The term used is then hydrodesulfurization (HDS) processes. However, these gasoline cuts and more particularly the gasolines resulting from FCC contain a significant part of unsaturated compounds in the form of monoolefins (approximately 20% to 50% by weight), which contribute to a good octane number, of diolefins (0.5% to 5% by weight) and of aromatics. These unsaturated compounds are unstable and react during the hydrodesulfurization treatment. The diolefins form gums by polymerization during the hydrodesulfurization treatments. This formation of gums results in a gradual deactivation of the hydrodesulfurization catalysts or in a gradual clogging of the reactor.

Consequently, the diolefins must be removed by hydrogenation before any treatment of these gasolines. Conventional treatment processes desulfurize gasolines in a nonselective manner by hydrogenating a large part of the monoolefins, which causes a high loss in octane number and a high consumption of hydrogen. The most recent hydrodesulfurization processes make it possible to desulfurize cracked gasolines rich in monoolefins, while limiting the hydrogenation of the monoolefins and consequently the loss of octane. Such processes are, for example, described in the documents EP-A-1 077 247 and EP-A-1 174 485.

Hydrodesulfurization processes are carried out continuously over periods of time of at least 3 to 5 years. The catalysts used to carry out the hydrodesulfurization of sulfur-containing gasolines must thus exhibit a good activity, a good selectivity and a good stability over time in order to be operated continuously for several years. However, the presence of heavy metals, such as mercury or arsenic, or of contaminants, such as phosphorus and silicon, in the form of organometallic compounds in the hydrocarbon feedstocks to be desulfurized results in a rapid deactivation of the hydrotreating catalysts. It is thus necessary to remove these contaminants from the feedstock before bringing it into contact with these hydrodesulfurization catalysts.

PRIOR ART

Various solutions have been proposed in the literature for extracting these compounds and more particularly arsenic in hydrocarbon fractions. However, there still exists a need to have available more efficient capture bodies for the selective extraction of heavy metals, such as arsenic, in the presence of olefins, with the objective of limiting the hydrogenation reactions responsible in this context for a decrease in the octane number of the gasolines concerned.

Many patents describe arsenic capture bodies using different active phases based on transition metals, generally partially in sulfide form.

Thus, the patent U.S. Pat. No. 4,046,674 describes a process for the removal of arsenic using a capture body containing at least one nickel compound in the sulfide form in an amount of between 30% and 70% by weight (with respect to the NiO form) and at least one molybdenum compound, also in the sulfide form, in an amount of between 2% and 20% by weight (with respect to the MoO3 form). The patent CN107011939A also describes a process for the removal of arsenic using a capture body comprising nickel and molybdenum but in an amount respectively of between 2% and 20% by weight of NiO and between 2% and 10% by weight of MoO3.

The patent FR 2 617 497 describes a process for the removal of arsenic from hydrocarbon cuts by contacting them with a capture body containing nickel, at least 50% by weight of which is in the metal form. A person skilled in the art is well aware of the hydrogenating properties of Ni and thus expects the direct application of such a capture body to lead to a more or less significant hydrogenation of a large part of the olefins present in the hydrocarbon cut to be treated, which does not respond to the problem which the present invention seeks to solve.

The patent EP 0 611 182 B1 describes a process for the removal of arsenic employing a capture body containing at least one metal from the nickel, cobalt, molybdenum, tungsten, chromium and palladium group, from 5% to 50% by weight of said metal(s) being in the sulfide form.

The patent FR 2 876 113 describes a process for the removal of arsenic employing a capture body comprising at least one metal element chosen from the group consisting of iron (Fe), cobalt (Co), nickel (Ni), copper (Cu), lead (Pb) or zinc (Zn) deposited on a porous support chosen from the group consisting of aluminas, silica, silicas/aluminas, or also titanium or magnesium oxides, used alone or as a mixture with alumina or silica/alumina, the metal element being in the sulfide form with a rate of sulfurization at least equal to 60%, and preferably greater than 70%.

The patent U.S. Pat. No. 5,024,683 describes a process for the at least partial removal of trialkylarsines contained in a feedstock containing them, comprising the step of bringing this feedstock into contact with a solid capture body comprising at least one copper sulfide and an inorganic support material.

The patent U.S. Pat. No. 6,759,364 and the patent application US2016008795 for their part describe catalysts suitable for the capture of arsenic in hydrocarbon cuts containing nickel, molybdenum and phosphorus.

The patent application CN105562000 describes an arsenic capture agent based on copper and nickel, the metals being in oxide form.

Besides the active phase, several patents also specify the type of support used for the arsenic capture body. The applications CN106833731 and CN106807420 thus describe capture bodies of the type of NiMoW on a support of alumina and zinc oxide composition. The patent FR 2 650 759 describes a capture body of the type of NiO on aluminate of at least one selected metal Mg, Ca, Sr, Ba, Mn, Fe, Co, Ni, Cu and Zn. The patent application JP60202190 claims a capture body for capturing the arsenic contained in a hydrocarbon feedstock, the capture body consisting of nickel oxide and molybdenum oxide supported on a composite support prepared by mixing oxides selected from zirconia, magnesium oxide and barium oxide with alumina. The patent application describes an arsenic capture agent based on copper and on nickel on an alumina support exhibiting a bimodal pore distribution.

Finally, patents relate to specific arsenic capture processes.

The patent FR 3 007 415 describes a process for the removal of arsenic from a hydrocarbon feedstock comprising bringing this feedstock into contact with two capture bodies comprising, for the first body, at least one metal M1 of Group VIb and at least two metals M2 and M3 of Group VIII and, for the second body, nickel in the sulfide form, it being possible for contact with the two bodies to be carried out either successively or simultaneously.

The patent FR 2 923 837 describes a fixed-bed process for the capture of arsenic and for the desulfurization of a hydrocarbon fraction comprising olefins, sulfur and arsenic, the first step of which consists in bringing a capture body into contact with said hydrocarbon fraction in the presence of hydrogen, said capture body comprising molybdenum and nickel in the sulfide form.

The patent JP 2040612 C3 claims a process for the removal of arsenic from a liquid hydrocarbon feedstock which consists in bringing the feedstock into contact, in the absence of hydrogen, with a capture body containing molybdenum sulfide and optionally cobalt and nickel.

Subject Matters of the Invention

The present invention relates to a process for the capture of organometallic impurities, such as organometallic impurities of heavy metals, silicon or phosphorus, and more particularly arsenic, in a hydrocarbon feedstock of gasoline type containing olefins and sulfur, in which a capture body is brought into contact with the feedstock to be treated and a stream of hydrogen at a temperature of between 200 and 400° C., a pressure of between 0.2 and 5 MPa and a ratio of the flow rate of hydrogen to the flow rate of hydrocarbon feedstock of between 50 and 800 $Nm^3/m^3$, said capture body comprises an active phase based on nickel oxide particles with a size of less than or equal to 15 nm, said active phase not comprising other metal elements of Group VIb or Group VIII, which are deposited on a porous support chosen from the group consisting of aluminas, silica, silicas/aluminas, or also titanium or magnesium oxides, used alone or as a mixture with alumina or silica/alumina.

This is because it has been discovered, surprisingly, that the use of this capture body makes it possible to efficiently capture organometallic impurities, and in particular the arsenic contained in a gasoline containing olefins and sulfur, while limiting the rate of hydrogenation of the olefins to values generally of less than 30%, preferentially of less than 20% and more preferably still of less than 10%.

Without being committed to any theory, it seems that the small size of the nickel oxide particles obtained by virtue of the preparation processes described below makes it possible to provide a dispersion of the active phase after sulfurization which is particularly suited to effectively capturing organometallic impurities and in particular the organometallic arsenic impurities contained in a gasoline containing olefins and sulfur.

In addition, the nickel sulfide particles formed after the sulfurization from the nickel oxide particles limit the rate of hydrogenation of the olefins and thus the loss in octane number.

To obtain a small size of the nickel oxide particles which are obtained by virtue of the preparation processes described below is all the more noteworthy as the body is loaded with nickel. Indeed, it is well known to a person skilled in the art that to obtain small particles is more difficult when the body contains more and more nickel. This effect is accentuated when the specific surface of the support is smaller and smaller.

According to an alternative form, the feedstock to be treated is a catalytic cracking gasoline containing between 5% and 60% by weight of olefins, from 50 ppm to 6000 ppm by weight of sulfur, as well as traces of arsenic in contents of between 10 ppb and 1000 ppb by weight.

According to an alternative form, the active phase of the capture body consists of nickel oxide particles with a size of less than or equal to 15 nm.

According to alternative form, the size of the nickel oxide particles of the active phase of the capture body is between 1 and 10 nm.

According to alternative form, the nickel content, expressed as nickel element, is between 5% and 65% by weight and preferably between 12% and 34% by weight, with respect to the total weight of the capture body.

According to an alternative form, the total pore volume of the capture body is greater than or equal to 0.45 ml/g.

According to an alternative form, the BET specific surface of the capture body is at least 40 $m^2/g$.

According to an alternative form, the active phase of the capture body is sulfurized in situ.

According to an alternative form, the organometallic impurities are chosen from organometallic impurities of heavy metals, silicon, phosphorus and arsenic.

According to an alternative form, said capture body is placed in a reactor located upstream of a hydrodesulfurization unit containing a hydrodesulfurization catalyst and/or of a selective hydrogenation unit containing a catalyst for the selective hydrogenation of said feedstock.

According to another alternative form, said capture body is placed in the actual interior of a reactor for the selective hydrogenation and/or hydrodesulfurization of said feedstock, at the head of said reactor.

According to these alternative forms, the ratio of volume of said capture body, with respect to the volume of said selective hydrogenation and/or hydrodesulfurization catalyst, is between 4% and 50%.

In the continuation, the groups of chemical elements are given according to the CAS classification (CRC Handbook of Chemistry and Physics, published by CRC Press, editor D. R. Lide, $81^{st}$ edition, 2000-2001). For example, Group VIII according to the CAS classification corresponds to the metals of Columns 8, 9 and 10 according to the new IUPAC classification.

Specific surface is understood to mean the BET specific surface (SKr in $m^2/g$) determined by nitrogen adsorption in accordance with the standard ASTM D 3663-78 drawn up from the Brunauer-Emmett-Teller method described in the periodical *The Journal of the American Chemical Society*, 1938, 60, 309.

Total pore volume of the capture body or of the support used for the preparation of the capture body according to the invention is understood to mean the volume measured by intrusion with a mercury porosimeter according to the standard ASTM D4284-83 at a maximum pressure of 4000 bar (400 MPa), using a surface tension of 484 dyne/cm and a contact angle of 140°. The wetting angle was taken equal to 140° by following the recommendations of the work "Techniques de l'ingénieur, traité analyse et caractérisation" [Techniques of the Engineer, Analysis Treatise and Characterization], pages 1050-1055, written by Jean Charpin and Bernard Rasneur. In order to obtain better accuracy, the value of the total pore volume corresponds to the value of the total pore volume measured by intrusion with a mercury porosimeter measured on the sample minus the value of the total pore volume measured by intrusion with a mercury porosimeter measured on the same sample for a pressure corresponding to 30 psi (approximately 0.2 MPa).

"Size of the nickel oxide particles" is understood to mean the size of the coherence domain of the nickel crystallites in the oxide form. This size of coherence domain of the nickel crystallites in the oxide form is determined by X-ray diffraction, from the width of the diffraction line located at the angle $2\theta=43°$, that is to say according to the crystallographic direction [200], using the Scherrer relationship. This method, used in X-ray diffraction on polycrystalline samples or powders, which links the full width at half maximum of the diffraction peaks to the size of the particles, is described in detail in the reference: J. Appl. Cryst. (1978), 11, 102-113, "Scherrer after sixty years: A survey and some new results in the determination of crystallite size", J. I. Langford and A. J. C. Wilson.

DETAILED DESCRIPTION OF THE INVENTION

The present invention relates to a process for the capture of organometallic impurities, such as organometallic impurities of heavy metals, silicon or phosphorus, and more particularly arsenic, in a hydrocarbon feedstock of gasoline type, in which a capture body is brought into contact with the feedstock to be treated and a stream of hydrogen at a temperature of between 200 and 400° C., a pressure of between 0.2 and 5 MPa and a ratio of the flow rate of hydrogen to the flow rate of hydrocarbon feedstock of between 50 and 800 $Nm^3/m^3$, said capture body comprises an active phase based on nickel oxide particles with a size of less than or equal to 15 nm, said active phase not comprising other metal elements of Group VIb or Group VIII, which are deposited on a porous support chosen from the group consisting of aluminas, silica, silicas/aluminas, or also titanium or magnesium oxides, used alone or as a mixture with alumina or silica/alumina.

Within the meaning of the present invention, the capture process according to the invention is a process for the at least partial capture of arsenic and optionally of silicon of the hydrocarbon feedstock in the presence of hydrogen in order to produce an effluent having a reduced content of heavy metals and in particular of arsenic, with a limited loss in octane number. The capture process according to the invention makes it possible to remove the arsenic and also to limit the rate of hydrogenation of the monoolefins. The rate of hydrogenation of the olefins is advantageously less than 50%, preferentially less than 30%, and more preferably still less than 20%.

The hydrocarbon feedstock to be treated is a hydrocarbon feedstock of gasoline type rich in olefins and in sulfur. Preferably, the hydrocarbon feedstock is a catalytic cracking gasoline obtained from catalytic cracking, thermal cracking or steam cracking units. The process can also be applied to the treatment of mixtures of direct distillation gasolines which may contain heavy metals resulting from crude oil with cracked gasolines comprising monoolefins and diolefins. Preferably, the hydrocarbon feedstock to be treated is a catalytic cracking gasoline comprising between 5% and 60% by weight of monoolefins, between 50 ppm and 6000 ppm by weight of sulfur compounds and between 10 and 1000 ppb by weight of arsenic.

The sulfur compounds contained in the hydrocarbon feedstock to be treated can be organic sulfur compounds, such as, for example, mercaptans, thiophene compounds, benzothiophene compounds and other aromatic sulfur compounds, disulfide compounds, and the like. The arsenic compounds contained in the hydrocarbon feedstock to be treated can be organic arsenic compounds, such as, for example, trimethylarsine or triethylarsine. Monoolefins denote hydrocarbon molecules exhibiting a single carbon-carbon double bond and diolefins are hydrocarbon molecules comprising at least two carbon-carbon double bonds. The monoolefins and the diolefins can be linear, branched and/or cyclic hydrocarbon molecules.

The capture body is advantageously employed under operating conditions such that the rate of capture of arsenic is maximized, while limiting the rate of hydrogenation of the olefins. The contacting operation is generally carried out at a temperature of between 200 and 400° C., at a pressure of between 0.2 and 5 MPa and with a ratio of the flow rate of hydrogen to the flow rate of hydrocarbon feedstock of between 50 and 800 $Nm^3/m^3$. The hydrogen used can result from any hydrogen source. Preferably, fresh hydrogen resulting from the refinery and/or recycled hydrogen from a hydrodesulfurization unit, preferably from the unit for hydrodesulfurization of the hydrocarbon cut to be purified, is used.

Several reactor technologies can be envisaged in order to carry out the capture of the arsenic of a hydrocarbon feedstock in the presence of the capture body according to the invention. The most conventional and widespread technology is fixed-bed technology. In this case, a reactor is charged with the capture body according to the invention and a hydrodesulfurization catalyst, operating in adsorption of arsenic and in hydrodesulfurization, in principle until the appearance of arsenic in the outlet effluent (phenomenon known to a person skilled in the art under the term breakthrough). In some cases, the total amounts of poisoned capture body can be replaced by an equivalent amount of fresh capture body. The choice of a technology for replacing the capture body according to the invention is not regarded within the context of the present invention as a limiting element. The capture body can be employed in a moving bed reactor, that is to say that the spent capture body is withdrawn continuously and replaced by fresh capture body. This type of technology makes it possible to maintain the capture of arsenic by the capture body and to avoid the breakthrough of the arsenic into the effluents produced. Among other solutions, mention may be made of the use of expanded bed reactors which also makes possible continuous withdrawal and topping up of the capture body in order to maintain the hydrodesulfurization activity of the capture body.

The capture body employed is provided in the form of a supported capture body comprising an active phase based on nickel oxide particles with a size of less than or equal to 15 nm and a porous support chosen from the group consisting of aluminas, silica, silicas/aluminas, or also titanium or magnesium oxides, used alone or as a mixture with alumina or silica/alumina. Said active phase does not comprise other metal elements of Group VIb or Group VIII. Preferably, the active phase consists of nickel oxide particles with a size of less than or equal to 15 nm.

The nickel is provided in the form of nickel oxide nanoparticles deposited on said support. The size of the nickel oxide nanoparticles in the capture body is less than or equal to 15 nm, preferably between 1 and 12 nm, more preferentially between 1 and 10 nm.

The nickel content, expressed as nickel element, is between 5% and 65% by weight, with respect to the total weight of the capture body, preferably between 8% and 55% by weight, more preferably still between 12% and 40% by weight and particularly preferably between 12% and 34% by weight. The Ni content is measured by X-ray fluorescence.

The capture body exhibits a total pore volume of greater than or equal to 0.45 ml/g, preferably of greater than or equal to 0.48 ml/g and particularly preferably of between 0.55 and 0.95 ml/g.

The capture body exhibits a BET specific surface of at least 40 m$^2$/g, preferably of at least 50 m$^2$/g, and more preferably still of between 55 and 250 m$^2$/g, and preferably of between 60 and 225 m$^2$/g.

Said capture body is in the form of grains having a mean diameter of between 0.5 and 10 mm. The grains can have all the forms known to a person skilled in the art, for example the form of beads (preferably having a diameter of between 1 and 6 mm), of extrudates, of tablets or of hollow cylinders. Preferably, the capture body (and the support used for the preparation of the capture body) are either in the form of extrudates with a mean diameter of between 0.5 and 10 mm, preferably between 0.8 and 3.2 mm, and with a mean length of between 0.5 and 20 mm, or in the form of beads with a mean diameter of between 0.5 and 10 mm, preferably between 1.4 and 4 mm. The term "mean diameter" of the extrudates is understood to mean the mean diameter of the circle circumscribed in the cross section of these extrudates. The capture body can advantageously be provided in the form of cylindrical, multilobal, trilobal or quadrilobal extrudates. Preferably, its form will be trilobal or quadrilobal. The shape of the lobes will be able to be adjusted according to all the known methods of the prior art.

The support of the capture body according to the invention is an inorganic support selected from the group consisting of aluminas, silica, silica/aluminas, titanium oxides, alone or as a mixture with alumina or silica/alumina, and magnesium oxides, alone or as a mixture with alumina or silica/alumina. Preferably, the support is selected from the group consisting of aluminas, silica and silicas/aluminas. Very preferably, the support is essentially composed of at least one alumina, that is to say that it comprises at least 51% by weight, preferably at least 60% by weight, very preferably at least 80% by weight, indeed even at least 90% by weight, of alumina, with respect to the total weight of said support. Preferably, said support has an alumina content of greater than or equal to 90% by weight, with respect to the total weight of said support, optionally supplemented by silica and/or phosphorus at a total content of at most 10% by weight as $SiO_2$ and/or $P_2O_5$ equivalent, preferably of less than 5% by weight and very preferably of less than 2% by weight, with respect to the total weight of the support. The silica and/or the phosphorus can be introduced by any technique known to a person skilled in the art, during the synthesis of the alumina gel or by impregnation of the support used for the preparation of the capture body according to the invention. More preferably still, the support consists of alumina. Preferably, the alumina present in said support is a transition alumina, such as a γ-, δ-, θ-, χ-, ρ- or η-alumina, alone or as a mixture. More preferably, the alumina is a γ, δ or θ transition alumina, alone or as a mixture.

The characteristics of the following support correspond to the characteristics of the support used for the preparation of the capture body according to the invention before impregnation of the active phase.

The support used for the preparation of the capture body according to the invention preferably exhibits a total pore volume of greater than or equal to 0.68 ml/g, preferably of greater than or equal to 0.70 ml/g and particularly preferably of between 0.70 and 1.0 ml/g.

The support used for the preparation of the capture body according to the invention exhibits a BET specific surface of at least 40 m$^2$/g, preferably of at least 50 m$^2$/g, and more preferably still of between 60 and 300 m$^2$/g, and preferably of between 80 and 250 m$^2$/g.

Process for the Preparation of the Capture Body

The applicant company has discovered that the small size of the nickel oxide particles obtained is due to the process for the preparation of the capture body.

According to a first alternative form, the small size of the nickel oxide particles obtained is due to the preparation process, including the introduction of an organic compound.

According to a second alternative form, the small size of the nickel oxide particles obtained is due to the preparation process, including the introduction of the nickel by a solution containing ammonium ions, also called the introduction of the nickel by the aqueous ammonia route.

Once the active phase is introduced into the support according to one of the two alternative forms, a drying stage and a heat treatment stage are carried out which are identical according to the two alternative forms.

First Alternative Form: Preparation of the Capture Body Using an Organic Compound According to a first alternative form, the capture body according to the invention is prepared by a process comprising at least the following stages:

i) a stage of bringing said support into contact with at least one solution containing at least one nickel precursor, i') a stage of bringing said support into contact with at least one solution containing at least one organic compound comprising oxygen and/or nitrogen and/or sulfur, stages i) and i') being carried out separately, in any order, or simultaneously, ii) a stage of drying said impregnated support at a temperature of less than 250° C., so as to obtain a dried capture body, iii) a heat treatment stage at a temperature of between 250° C. and 1000° C. of the dried capture body.

Stage i) Bringing the Nickel Precursor into Contact with the Support

According to stage i) of the first alternative form of the process according to the invention, the support is brought into contact with a solution comprising the salt(s) of the precursor(s) of the nickel-based active phase.

The deposition of the nickel on said support, in accordance with the implementation of stage i), can be carried out by any method well known to a person skilled in the art. In particular, said stage i) can be carried out by dry impregnation, by excess impregnation, or also by deposition/precipitation, according to methods well known to a person skilled in the art.

Said stage i) is preferentially carried out by impregnation of the support consisting, for example, in bringing said support into contact with at least one solution, which is aqueous or organic (for example methanol or ethanol or phenol or acetone or toluene or dimethyl sulfoxide (DMSO)) or else consists of a mixture of water and of at least one organic solvent, containing at least one nickel precursor at least partially in the dissolved state, or else in bringing said support into contact with at least one colloidal solution of at least one precursor of the nickel, in the oxidized form (nanoparticles of oxides, of oxy(hydroxide) or of hydroxide of the nickel) or in the reduced form (metal nanoparticles of the nickel in the reduced state). Preferably, the solution is aqueous. The pH of this solution will be able to be modified by the optional addition of an acid or of a base. According to another preferred alternative form, the aqueous solution can contain aqueous ammonia or ammonium $NH_4^+$ ions.

Preferably, said stage i) is carried out by dry impregnation, which consists in bringing the support of the capture body into contact with a solution containing at least one precursor of the nickel, the volume of the solution of which is between 0.25 and 1.5 times the pore volume of the support to be impregnated.

When the nickel precursor is introduced in aqueous solution, use is advantageously made of a nickel precursor in the nitrate, carbonate, chloride, sulfate, hydroxide, hydroxycarbonate, formate, acetate or oxalate form, in the form of complexes formed with acetylacetonates, or also in the form of tetrammine or hexammine complexes, or in the form of any other inorganic derivative which is soluble in aqueous solution, which is brought into contact with said support. Use is advantageously made, as nickel precursor, of nickel nitrate, nickel carbonate, nickel chloride, nickel hydroxide or nickel hydroxycarbonate. Very preferably, the nickel precursor is nickel nitrate, nickel carbonate or nickel hydroxide.

The amounts of the nickel precursor(s) introduced into the solution are chosen so that the total nickel content, expressed as nickel element, is between 5% and 65% by weight, preferably between 8% and 55% by weight, in a preferred way between 12% and 40% by weight and particularly preferably between 12% and 34% by weight, with respect to the total weight of the capture body. The nickel contents, expressed as nickel element, are generally appropriate to the targeted arsenic capture as described above in the section of the description of the capture body.

Any other additional element can be introduced at the time of this stage: when it is desired to introduce phosphorus, a phosphoric acid solution can be introduced into the impregnation solution.

Stage i') Bringing the Organic Compound into Contact with the Support

According to stage i') of the first alternative form of the process according to the invention, said support is brought into contact with at least one solution containing at least one organic compound comprising oxygen and/or nitrogen and/or sulfur.

The introduction of an organic compound comprising oxygen and/or nitrogen and/or sulfur makes it possible to increase the dispersion of the active phase, thus leading via the nickel oxide particles to small-sized particles of nickel sulfides after sulfurization.

Bringing said support into contact with at least one solution containing at least one organic compound comprising oxygen and/or nitrogen and/or sulfur, in accordance with the implementation of said stage i'), can be carried out by any method well known to a person skilled in the art. In particular, said stage i') can be carried out by dry impregnation or by excess impregnation according to methods well known to a person skilled in the art. Preferably, said stage i') is carried out by dry impregnation, which consists in bringing the support of the catalyst into contact with a volume of said solution of between 0.25 and 1.5 times the pore volume of the support to be impregnated.

Said solution containing at least one organic compound can be aqueous or organic (for example methanol or ethanol or phenol or acetone or toluene or dimethyl sulfoxide (DMSO)) or else formed of a mixture of water and of at least one organic solvent. Said organic compound is, beforehand, at least partially dissolved in said solution at the desired concentration. Preferably, said solution is aqueous or contains ethanol. More preferably still, said solution is aqueous. The pH of said solution will be able to be modified by the optional addition of an acid or of a base. In another possible embodiment, the solvent can be absent from the impregnation solution.

In the embodiment in which stage i') is carried out by dry impregnation or excess impregnation, preferably dry impregnation, the impregnation of the support with at least one solution containing at least said organic compound can advantageously be carried out via at least two impregnation cycles, using identical or different organic compounds in each cycle. In this case, each impregnation is advantageously followed by drying and optionally by a heat treatment.

The molar ratio of said organic compound introduced during stage i'), with respect to the nickel element introduced in stage i), is between 0.01 and 5.0 mol/mol, preferably between 0.05 and 2.0 mol/mol.

Generally, the organic compound comprising oxygen and/or nitrogen and/or sulfur is chosen from a compound comprising one or more chemical functional groups chosen from a carboxylic acid, alcohol, thiol, thioether, sulfone, sulfoxide, ether, aldehyde, ketone, ester, carbonate, amine, nitrile, imide, oxime, urea and amide functional group.

Preferably, the organic compound is chosen from a compound comprising at least one carboxylic acid functional group, or at least one alcohol functional group, or at least one ester functional group, or at least one amide functional group.

In one embodiment according to the invention, said organic compound comprises at least one carboxylic acid functional group. Preferably, said organic compound is chosen from monocarboxylic acids, dicarboxylic acids, tricarboxylic acids or tetracarboxylic acids. In this case, the organic compound is more preferentially chosen from oxalic acid, malonic acid, glutaric acid, glycolic acid, lactic acid, tartronic acid, citric acid, acid tartaric, pyruvic acid and γ-ketovaleric acid.

In one embodiment according to the invention, said organic compound comprises at least one alcohol functional group. Preferably, said organic compound is chosen from:
- organic compounds comprising a single alcohol functional group;
- organic compounds comprising two alcohol functional groups;
- organic compounds chosen from diethylene glycol, triethylene glycol, tetraethylene glycol or a polyethylene glycol corresponding to the formula $H(OC_2H_4)_nOH$ with n greater than 4 and having an average molar mass of less than 20000 g/mol;
- monosaccharides of empirical formula $C_n(H_2O)_p$ with n between 3 and 12;
- disaccharides, trisaccharides, or monosaccharide derivatives.

In this case, the organic compound is more preferentially chosen from methanol, ethanol, phenol, ethylene glycol, propane-1,3-diol, butane-1,4-diol, pentane-1,5-diol, hexane-1,6-diol, glycerol, xylitol, mannitol, sorbitol, pyrocatechol, resorcinol, hydroquinone, diethylene glycol, triethylene glycol, polyethylene glycols having an average molar mass of less than 600 g/mol, glucose, mannose, fructose, sucrose, maltose or lactose, in any one of their isomeric forms.

In one embodiment according to the invention, said organic compound comprises at least one ester functional group.

Preferably, said organic compound is chosen from:
- carboxylic acid unsaturated linear or cyclic or cyclic esters;
- organic compounds comprising at least two carboxylic acid ester functional groups;
- organic compounds comprising at least one carboxylic acid ester functional group and at least one second functional group chosen from alcohols, ethers, ketones or aldehydes;
- carbonic acid cyclic or linear esters;
- carbonic acid linear diesters.

In this case, the organic compound is more preferentially chosen from γ-valerolactone, methyl laurate, di($C_1$-$C_4$ alkyl) succinate and more particularly dimethyl succinate, dimethyl malate, an acetoacid and propylene carbonate.

In one embodiment according to the invention, said organic compound comprises at least one amide functional group.

Preferably, said organic compound is chosen from:
- acyclic amides comprising one or two amide functional groups;
- cyclic amides or lactams;
- organic compounds comprising at least one amide functional group and a carboxylic acid functional group or an alcohol functional group;
- organic compounds comprising at least one amide functional group and an additional nitrogen heteroatom.

In this case, the organic compound is more preferentially chosen from formamide, N-methylformamide, N,N-dimethylformamide, N-ethylformamide, N,N-diethylformamide, acetamide, N-methylacetamide, N,N-dimethylmethanamide, N,N-diethylacetamide, N,N-dimethylpropionamide, propanamide, 2-pyrrolidone, N-methyl-2-pyrrolidone, γ-lactam, caprolactam, acetylleucine, N-acetylaspartic acid, aminohippuric acid, N-acetylglutamic acid, 4-acetamidobenzoic acid, lactamide, glycolamide, urea, N-methylurea, N,N'-dimethylurea, 1,1-dimethylurea or tetramethylurea, according to any one of their isomeric forms.

The sulfur-containing organic compound can be one or more chosen from compounds comprising one or more chemical functional groups chosen from a thiol, thioether, sulfone or sulfoxide functional group. By way of example, the sulfur-containing organic compound can be one or more chosen from the group consisting of thioglycolic acid, 2-hydroxy-4-methylthiobutanoic acid, a sulfone derivative of a benzothiophene and a sulfoxide derivative of a benzothiophene.

The first alternative form of the process for the preparation of the capture body comprises several embodiments when it is desired to add the organic compound. They differ in particular in the order of introduction of the organic compound and of the nickel precursor, it being possible for the organic compound to be brought into contact with the support either after the nickel precursor has been brought into contact with the support, or before the nickel precursor is brought into contact with the support, or at the same time as the nickel is bought into contact with the support.

In one embodiment according to the invention, stages i) and i') of the process according to the invention are carried out simultaneously.

In another embodiment according to the invention, stage i) of the process according to the invention is carried out before stage i').

In yet another embodiment according to the invention, stage i') of the process according to the invention is carried out before stage i).

Each contacting stage i) and i') is carried out at least once and can advantageously be carried out several times, optionally in the presence of a nickel precursor and/or of an organic compound which is (are) identical or different at each stage i) and/or i') respectively, all the possible combinations for carrying out stages i) and i') coming within the scope of the invention.

Each contacting stage can preferably be followed by an intermediate drying stage. The intermediate drying stage is carried out at a temperature of less than 250° C., preferably of between 15° C. and 240° C., more preferentially between 30° C. and 220° C., more preferentially still between 50° C. and 200° C. and in an even more preferential way between 70° C. and 180° C. Advantageously, when an intermediate drying stage is carried out, an intermediate calcination stage can be carried out. The intermediate calcination stage is carried out at a temperature of between 250° C. and 1000° C., preferably between 250° C. et 750° C.

Advantageously, after each contacting stage, whether this is a stage of bringing the nickel precursor into contact with the support, a stage of bringing the organic compound into contact with the support, or a stage of bringing the nickel precursor and the organic compound into contact simultaneously with the support, it is possible to leave the impregnated support to mature, optionally before an intermediate drying stage. Maturing makes it possible for the solution to be distributed homogeneously within the support. When a maturing stage is carried out, said stage is advantageously carried out at atmospheric pressure or at reduced pressure, under an inert atmosphere or under an oxygen-containing atmosphere or under a water-containing atmosphere, and at a temperature of between 10° C. and 50° C. and preferably at ambient temperature. Generally, a maturing time of less than forty-eight hours and preferably of between five minutes and five hours is sufficient.

Second Alternative Form: Preparation of the Capture Body by the Aqueous Ammonia Route According to a second alternative form, the capture body according to the invention is prepared by a process comprising at least the following stages:

i) a stage of bringing said support into contact with at least one solution containing ammonium ions and containing at least one nickel precursor;
ii) a stage of drying said impregnated support at a temperature of less than 250° C., so as to obtain a dried capture body;
iii) a heat treatment stage at a temperature of between 250° C. and 1000° C. of the dried capture body.

According to stage i) of this second alternative form of the process according to the invention, the support is brought into contact with a solution containing ammonium ions and comprising the salt(s) of the precursor(s) of the active phase based on nickel at least partially in the dissolved state.

The term "solution containing ammonium ions" is understood to mean any water/ammonia mixture or an aqueous solution prepared by dissolving one or more ammonium salts, such as ammonium carbonate or ammonium hydrogencarbonate or ammonium bicarbonate, in a water/ammonia mixture.

Said nickel precursor is introduced into the solution containing ammonium ions by introducing a nickel salt, for example nickel carbonate, nickel chloride, nickel sulfate, nickel hydroxide or nickel hydroxycarbonate. Use is advantageously made, as nickel precursor, of nickel carbonate, nickel hydroxide or nickel hydroxycarbonate.

The deposition of the nickel on said support, in accordance with the implementation of stage i), can be carried out by any method well known to a person skilled in the art. In particular, said stage i) can be carried out by dry impregnation, by excess impregnation, or also by deposition/precipitation, according to methods well known to a person skilled in the art.

Preferably, said stage i) is carried out by dry impregnation, which consists in bringing the support of the capture body into contact with a solution containing at least one precursor of the nickel, the volume of the solution of which is between 0.25 and 1.5 times the pore volume of the support to be impregnated.

The amounts of the nickel precursor(s) introduced into the solution are chosen so that the total nickel content, expressed as nickel element, is between 5% and 65% by weight, preferably between 8% and 55% by weight, in a preferred way between 12% and 40% by weight and particularly preferably between 12% and 34% by weight, with respect to the total weight of the capture body. The nickel contents, expressed as nickel element, are generally appropriate to the targeted arsenic capture as described above in the section of the description of the capture body.

Any other additional element can be introduced at the time of this stage. When it is desired to introduce phosphorus, a phosphoric acid solution can be introduced into the impregnation solution.

Once the active phase is introduced into the support according to the two alternative forms (organic compound or aqueous ammonia route), a drying stage is carried out, then a heat treatment stage.

Stage ii) Drying the Impregnated Support

According to the invention, the impregnated support obtained on conclusion of stage i) or, when an organic compound has been introduced, obtained on conclusion of stage i) or i') undergoes a drying stage ii) at a temperature of less than 250° C., preferably of between 15° C. and 240° C., more preferentially between 30° C. and 220° C., more preferentially still between 50° C. and 200° C. and in a more preferential way still between 70° C. and 180° C., for a period of time typically of between 10 minutes and 24 hours. The drying stage can be carried out by any technique known to a person skilled in the art. It is advantageously carried out under an inert atmosphere or under an oxygen-containing atmosphere or under a mixture of inert gas and oxygen. It is advantageously carried out at atmospheric pressure or at reduced pressure. Preferably, this stage is carried out at atmospheric pressure and in the presence of air or of nitrogen.

A dried capture body is obtained.

Stage iii) Heat Treatment of the Dried Capture Body

The capture body thus dried subsequently undergoes a heat treatment stage iii) at a temperature of between 250° C. and 1000° C. and preferably between 250° C. and 750° C. The duration is typically between 15 minutes and 10 hours. The heat treatment is carried out under an inert atmosphere or under an oxygen-containing atmosphere, in the presence or absence of water.

The term "heat or hydrothermal treatment" is understood to mean the temperature treatment respectively without the presence or in the presence of water. In the latter case, contact with steam can take place at atmospheric pressure or under autogenous pressure (autoclaving). Several combined cycles of heat or hydrothermal treatments can be carried out. After this or these treatment(s), the capture body precursor comprises nickel in the oxide form, that is to say in the NiO form.

In the case of hydrothermal treatment, the water content is preferably between 150 and 900 grams per kilogram of dry air and more preferably still between 250 and 650 grams per kilogram of dry air.

A calcined capture body is obtained.

Step iv) Sulfurization of the Capture Body

After the heat treatment stage iii), the calcined capture body comprising nickel in the oxide form must be sulfurized so as to form nickel sulfide, which is the active form for capturing the impurities, and in particular arsenic. This sulfurization is carried out in the context of the invention in situ (inside the reactor of the capture process) by methods well known to a person skilled in the art, and advantageously under a sulfo-reducing atmosphere in the presence hydrogen and of hydrogen sulfide. Sulfurization can be carried out by injecting, onto the capture body, a stream containing $H_2S$ and hydrogen, or else a sulfur compound capable of decomposing to give $H_2S$ in the presence of the capture body and of hydrogen. Polysulfides, such as dimethyl disulfide, are $H_2S$ precursors commonly used to sulfurize capture bodies. It is also possible for the sulfur to originate from the feedstock itself containing sulfur. The temperature is adjusted in order for the $H_2S$ to react with the nickel to form nickel sulfide. This sulfurization can be carried out at temperatures of between 200° C. and 600° C. and more preferentially between 250° C. and 500° C. In order to be active, the nickel should preferably be substantially sulfurized. The operating conditions of the sulfurization, in particular the nature of the sulfurizing agent, the $H_2S$/hydrogen ratio, the temperature and the duration of the sulfurization will preferably be adapted so as to obtain good sulfurization of the nickel.

Optional Selective Hydrodesulfurization/Hydrogenation Stages

The capture process according to the invention is preferably coupled with at least one additional stage of selective hydrogenation or catalytic hydrodesulfurization which is carried out on the effluent resulting from the operation of bringing into contact with the capture body according to the invention. Thus, the stage of treatment of the hydrocarbon feedstock by the capture body is regarded as a pretreatment which makes it possible in particular to preserve the catalytic activity of the catalyst used in the subsequent stage of selective hydrogenation or hydrodesulfurization. Thus, the capture process according to the invention comprises one or more other additional stages of selective hydrogenation or hydrodesulfurization in which the effluent resulting from bringing the hydrocarbon feedstock into contact with the capture body according to the invention is brought into contact with at least one other catalyst for the selective hydrogenation or hydrodesulfurization of the diolefins present in the feedstock of olefins. Said additional hydrodesulfurization stage(s) make(s) it possible to remove the residual sulfur compounds contained in the effluent depleted in arsenic and having a lower content of sulfur. Some of these residual sulfur compounds can result from the addition of $H_2S$ to the olefins present in the feedstock. $H_2S$ can be formed during the operation in which the hydrocarbon feedstock is brought into contact with the capture body, that is to say during the capture of arsenic. Said additional hydrodesulfurization stage(s) is (are) implemented when the effluent resulting from the operation in which the hydrocarbon feedstock is brought into contact with the capture body generally exhibits a sulfur content of greater than 10 ppm and when it is necessary to produce gasolines having a low sulfur content meeting the current specifications, which in many countries are below 10 ppm. The effluent freed of arsenic and from a part of the sulfur compounds is then treated in at least one of said additional stages of selective hydrodesulfurization. In said stage(s), said effluent is brought into contact with at least one other hydrodesulfurization catalyst under operating conditions which can be identical to or different from those under which the hydrocarbon feedstock was brought into contact with the capture body. The catalyst(s) used in said additional hydrodesulfurization stage(s) is (are) protected from deactivation by the arsenic present in the feedstock by virtue of the capture body according to the invention. Thus, very selective hydrodesulfurization catalysts which are sensitive to the presence of arsenic can be employed in said additional hydrodesulfurization stage(s). Any hydrodesulfurization catalyst can be used in said additional hydrodesulfurization stage(s). Preferably, use is made of catalysts which exhibit a high selectivity with respect to the hydrodesulfurization reactions, in comparison with the reactions for hydrogenation of the olefins. Such catalysts comprise at least one porous and amorphous inorganic support, a metal of Group VIb, a metal of Group VIII. The metal of Group VIb is preferentially molybdenum or tungsten and the metal all Group VIII is preferentially nickel or cobalt. The support is generally selected from the group consisting of aluminas, silica, silica/aluminas, silicon carbide, titanium oxides, alone or as a mixture with alumina or silica/alumina, and magnesium oxides, alone or as a mixture with alumina or silica/alumina. Preferably, the support is selected from the group consisting of aluminas, silica and silica/aluminas. Preferably, the hydrodesulfurization catalyst used in the additional hydrodesulfurization stage(s) exhibits the following characteristics:
the content of elements of Group VIb is between 1% and 20% by weight of oxides of elements of Group VIb;
the content of elements of Group VIII is between 0.1% and 20% by weight of oxides of elements of Group VIII;

the molar ratio (elements of Group VIII/elements of Group VIb) is between 0.1 and 0.8.

A very preferred hydrodesulfurization catalyst comprises cobalt and molybdenum and has the abovementioned characteristics. Furthermore, the hydrodesulfurization catalyst can comprise phosphorus. In this case, the phosphorus content is preferably between 0.1% and 10% by weight of $P_2O_5$, with respect to the total weight of catalyst, and the phosphorus to elements of Group VIb molar ratio is greater than or equal to 0.25, preferably greater than or equal to 0.27. In said additional hydrodesulfurization stage(s), the effluent depleted in arsenic resulting from bringing the hydrocarbon feedstock into contact with the capture body according to the invention is brought into contact with at least one other selective hydrodesulfurization catalyst under the following operating conditions:
a temperature of between approximately 210° C. and approximately 410° C., preferentially between 240° C. and 360° C.;
a total pressure of between 0.2 and 5 MPa and more preferentially between 0.5 and approximately 3 MPa;
a volume of hydrogen per volume of hydrocarbon feedstock ratio of between 50 and 800 $Nm^3/m^3$ and more preferentially between 60 and 600 $Nm^3/m^3$. In an alternative form of the process according to the invention, the operating conditions for bringing the hydrocarbon feedstock into contact with the capture body according to the invention are identical to those employed in said additional hydrodesulfurization stage(s). According to another embodiment, the stage of hydrotreating the effluent resulting from the stage of capture by means of the capture body according to the invention is a selective hydrogenation which makes possible the hydrogenation of the diolefins to give olefins and optionally of the unsaturated sulfur compounds but also the conversion (increased weight) of the light sulfur compounds (i.e., having a lower temperature than that of thiophene) into sulfur compounds, the temperature of which is greater than that of thiophene, for example by addition of mercaptans to olefins. This hydrogenation stage is carried out in the presence of hydrogen and of a catalyst containing at least one metal of Group VIb and at least one non-noble metal of Group VIII deposited on a porous support. Preferably, a catalyst is used:
the content by weight of oxide of the element of Group VIb of which is between 6% and 18%, with respect to the weight of the catalyst;
the content by weight of oxide of the element of Group VIII of which is between 4% and 12%, with respect to the weight of the catalyst;
the specific surface of which of the catalyst is between 200 and 270 $m^2/g$;
the density of the element of Group VIb of which, expressed as being the ratio of said content by weight of oxide of the element of Group VIb to the specific surface of the catalyst, is between 4 and $6.10^{-4}$ $g/m^2$;
the molar ratio of the metal of Group VIII to the metal of Group VIb of which is between 0.6 and 3 mol/mol.

The metal of Group VIb is preferably chosen from molybdenum and tungsten; very preferably, the metal of Group VIb is molybdenum. The metal of Group VIII is preferably nickel and/or cobalt, very preferably nickel. The hydrogen is generally introduced in a slight excess, up to 5 moles per mol, with respect to the stoichiometry, necessary to hydrogenate the diolefins (one mole of hydrogen per mol of diolefin). The mixture consisting of gasoline and hydrogen is brought into contact with the catalyst under a pressure of between 0.5 and 5 MPa, a temperature of between 80° C. and 220° C., with a liquid space velocity (LHSV) of between 1 and 10 h$^{-1}$, the liquid space velocity being expressed in liter of feedstock per liter of catalyst and per hour (l/l·h). In an alternative form of the process according to the invention, the capture body according to the invention can be placed in the position of a guard bed of one or more reactor(s) containing the catalyst(s) employed in said additional stage(s) of selective hydrogenation and/or hydrodesulfurization. In another alternative form of the process according to the invention, the capture body according to the invention is placed in a "capture" reactor. This reactor is separate from and is placed upstream of the reactor(s) containing the catalyst(s) employed in said additional stage(s) of selective hydrogenation and/or hydrodesulfurization. In all the alternative forms of the process according to the invention, employing at least one additional stage of selective hydrogenation and/or hydrodesulfurization, the ratio of volume of the capture body according to the invention with respect to the volume of the catalyst(s) employed in said additional stage(s) of selective hydrogenation and/or hydrodesulfurization is advantageously between 4% and 50%, preferably between 5% and 40%, more preferably between 5% and 35%.

The invention is illustrated by the examples which follow.

Example 1: Body Prepared by Impregnation According to the State of the Art (Comparative)

In this example, the solid A is prepared by double dry impregnation of the alumina support via an aqueous solution of nickel nitrate. Drying at 120° C., followed by calcination at 450° C., are carried out after each impregnation.

Example 2: Body Prepared in the Presence of Citric Acid (According to the Invention)

In this example, the solid B is prepared by dry impregnation of the alumina support via a solution of nickel nitrate in the presence of citric acid (CA), with a molar ratio CA/Ni=0.3. Drying at 120° C., followed by calcination at 450° C., are carried out.

Example 3: Body Prepared by the Aqueous Ammonia Route (According to the Invention)

In this example, the solid C is prepared by dry impregnation of the alumina support via an ammoniacal solution of nickel carbonate. Drying at 150° C., followed by final calcination at 280° C., are carried out.

Example 4: Body Prepared by the Aqueous Ammonia Route (According to the Invention)

In this example, the solid D is prepared by a double dry impregnation of the alumina support via an ammoniacal solution of nickel carbonate. Drying at 150° C., followed by calcination at 280° C., are carried out after each impregnation.

The characteristics of the solids A, B, C and D shown in the table below are obtained by the following techniques:
BET specific surface: Adsorption/Desorption of nitrogen at 77K
Nickel content: X-ray fluorescence (XF)
Identification of the Phases and Sizes of the Crystallites: X-ray diffraction (XRD) according to the method described.

Example 5: Evaluation of the Performance Qualities of the Capture Bodies with Regard to the Capture of Arsenic The performance of a nickel-based capture body is carried out by monitoring the rate of disappearance of an arsenic compound dissolved in a model feedstock brought into contact with the solid, after sulfurization, during a reaction carried out in static mode in a stirred and closed autoclave reactor, at the temperature of 210° C., in the presence of hydrogen and under a total pressure of 35 bar (3.5 MPa).

A model feedstock is used for all the tests. It is composed of a volume of 250 cm$^3$ of toluene, i.e. 217 g, and of triphenylarsine (AsPh3), with a content of 500 ppm MAs as "As" equivalent, i.e. approximately 1.45 mmol of As. The solid body used is adjusted so as to obtain an initial Ni/As molar ratio of 5 in order to take into account the differences in nickel content over the different solids.

The solid in NiO oxide form is placed in the reactor in the presence of solvent (toluene), then sulfurized in situ under a flow of an H$_2$/H$_2$S mixture at 15 vol % H$_2$S and at a temperature of 350° C. for 2 hours, then cooled under pure hydrogen with a plateau at 200° C. for 2 hours. The temperature is subsequently fixed at 210° C. and the pressure at 35 bar (3.5 MPa) by addition of hydrogen. The model feedstock containing the arsenic compound is subsequently introduced into the reactor. The rate of disappearance of the arsenic compound is then determined by chromatographic analysis.

| Body | A (comparative) | B (according to the invention) | C (according to the invention) | D (according to the invention) |
| --- | --- | --- | --- | --- |
| preparation | conventional impregnation | citric acid | aqueous ammonia route | aqueous ammonia route |
| S$_{BET}$ support (m$^2$·g$^{-1}$) | 152 | 152 | 152 | 180 |
| Ni content (%) | 20 | 13.4 | 13.4 | 19.5 |
| mean diameter of the nickel oxide crystallites (nm) | 20 | 7.5 | 3.5 | 5 |
| relative rate of disappearance of the As | 100 | 125 | 149 | 145 |

Example 6: Evaluation of the Performance Qualities of the Hydrogenation of the Olefins A catalytic cracking (FCC or Fluid Catalytic Cracking) gasoline, the characteristics of which are collated in the table below, is brought into contact with the different capture bodies. The reaction is carried out in a reactor of traversed bed type under the following conditions: P=2 MPa, H$_2$/HC=360 liters/liters of hydrocarbon feedstock, hourly space velocity (HSV)=10 h$^{-1}$, the temperature being fixed at 250° C. The effluents are analyzed by gas chromatography for the determination of the hydrocarbon concentrations.

| | |
|---|---|
| S ppm | 392 |
| Aromatics wt % | 41.3 |
| Paraffins wt % | 27.2 |
| Naphthenics wt % | 11.0 |
| Olefins wt % | 20.5 |
| $T_5$ °C. | 62 |
| $T_{95}$ °C. | 225 |

For all of the bodies tested, the hydrogenation of the olefins is extremely low and less than 2%.

The invention claimed is:

1. A process for the capture of organometallic impurities in a hydrocarbon feedstock of gasoline type containing olefins and sulfur, in which a capture body is brought into contact with the feedstock to be treated and a stream of hydrogen at a temperature of between 200 and 400° C., a pressure of between 0.2 and 5 MPa and a ratio of the flow rate of hydrogen to the flow rate of hydrocarbon feedstock of between 50 and 800 Nm³/m³, said capture body comprises an active phase consisting of nickel oxide particles with a size of less than or equal to 15 nm, said active phase not containing other metal elements of Group VIb or Group VIII, which are deposited on a porous support selected from the group consisting of aluminas, silica, silicas/aluminas, titanium oxides and magnesium oxides, used alone or as a mixture with alumina or silica/alumina, the nickel content of the capture body, expressed as nickel element, is between 12% and 36% by weight with respect to the total weight of the capture body, the capture body having been prepared by either a first process comprising at least the following stages:
i) a stage of bringing said support into contact with at least one solution containing at least one nickel precursor,
i') a stage of bringing said support into contact with at least one solution containing at least one organic compound comprising oxygen and/or nitrogen and/or sulfur, stages i) and i') being carried out separately, in any order, or simultaneously, to obtain an impregnated support,
ii) a stage of drying said impregnated support at a temperature of less than 250° C. to obtain a dried capture body, and
iii) a heat treatment stage at a temperature of between 250° C. and 1000° C. of the dried capture body:

or a second process comprising at least the following stages:
i) a stage of bringing said support into contact with at least one solution containing ammonium ions and containing at least one nickel precursor, to obtain an impregnated support;
ii) a stage of drying said impregnated support at a temperature of less than 250° C. to obtain a dried capture body, and
iii) a heat treatment stage at a temperature of between 250° C. and 1000° C. of the dried capture body.

2. The capture process as claimed in claim 1, in which the feedstock to be treated is a catalytic cracking gasoline containing between 5% and 60% by weight of olefins, from 50 ppm to 6000 ppm by weight of sulfur, as well as traces of arsenic in contents of between 10 ppb and 1000 ppb by weight.

3. The capture process as claimed in claim 1, in which the size of the nickel oxide particles of the active phase of the capture body is between 1 and 10 nm.

4. The capture process as claimed in claim 1, in which the total pore volume of the capture body is greater than or equal to 0.45 ml/g.

5. The capture process as claimed in claim 1, in which the BET specific surface of the capture body is at least 40 m²/g.

6. The capture process as claimed in claim 1, in which the active phase of the capture body is sulfurized in situ.

7. The capture process as claimed in claim 1, in which the organometallic impurities are chosen from heavy metals, silicon, phosphorus and arsenic.

8. The capture process as claimed in claim 1, in which said capture body is placed in a reactor located upstream of a hydrodesulfurization unit containing a hydrodesulfurization catalyst and/or of a selective hydrogenation unit containing a catalyst for the selective hydrogenation of said feedstock.

9. The capture process as claimed in claim 8, in which the ratio of volume of said capture body, with respect to the volume of said selective hydrogenation and/or hydrodesulfurization catalyst, is between 4% and 50%.

10. The capture process as claimed in claim 1, in which said capture body is placed in the actual interior of a reactor for the selective hydrogenation and/or hydrodesulfurization of said feedstock, at the head of said reactor.

11. The capture process as claimed in claim 10, in which the ratio of volume of said capture body, with respect to the volume of said selective hydrogenation and/or hydrodesulfurization catalyst, is between 4% and 50%.

12. The capture process as claimed in claim 10, wherein the capture body has been prepared by said first process.

13. The capture process as claimed in claim 10, wherein the capture body has been prepared by said second process.

* * * * *